(12) United States Patent
Guice et al.

(10) Patent No.: US 7,501,979 B1
(45) Date of Patent: Mar. 10, 2009

(54) AIRBORNE BIOTA MONITORING AND CONTROL SYSTEM

(76) Inventors: David L. Guice, 230 Haden Rd., Brownsboro, AL (US) 35741; William V. Dent, 2011 Alexander Dr. SE., Huntsville, AL (US) 36801; Augustus Hammond Green, Jr., P.O. Box 270, New Market, AL (US) 35761

( * ) Notice: Subject to any disclaimer, the term of this patent is extended or adjusted under 35 U.S.C. 154(b) by 221 days.

(21) Appl. No.: 11/054,685

(22) Filed: Feb. 8, 2005

Related U.S. Application Data

(63) Continuation-in-part of application No. 10/721,112, filed on Nov. 25, 2003, now Pat. No. 6,853,328, which is a continuation-in-part of application No. 09/571,295, filed on May 14, 2000, now Pat. No. 6,653,971.

(60) Provisional application No. 60/134,081, filed on May 14, 1999.

(51) Int. Cl.
*G01S 13/88* (2006.01)
*A01M 1/22* (2006.01)

(52) U.S. Cl. .............................. 342/54; 342/22; 342/27; 342/28; 342/52; 342/175; 342/195; 235/400; 235/404; 235/411

(58) Field of Classification Search ................... 342/22, 342/27, 28, 52–56, 59, 90, 175, 192–197, 342/73–81; 250/493.1, 494.1, 495.1; 73/587; 43/107, 112, 121, 124, 132.1, 133, 138, 144; 356/4.01–5.15; 235/400, 404–411; 446/473; 434/1–10
See application file for complete search history.

(56) References Cited

U.S. PATENT DOCUMENTS

| | | | | | |
|---|---|---|---|---|---|
| 4,091,367 | A | * | 5/1978 | Harman | 342/27 |
| 4,449,041 | A | * | 5/1984 | Girard | 235/412 |
| 4,963,888 | A | * | 10/1990 | Taylor et al. | 342/90 |
| 5,012,113 | A | * | 4/1991 | Valentine et al. | 250/493.1 |
| 5,134,410 | A | * | 7/1992 | Shrader | 342/90 |
| 5,343,652 | A | * | 9/1994 | Johnson | 43/132.1 |
| 5,774,088 | A | * | 6/1998 | Kreithen | 342/22 |
| 6,653,971 | B1 | * | 11/2003 | Guice et al. | 342/54 |
| 6,853,328 | B1 | * | 2/2005 | Guice et al. | 342/54 |

OTHER PUBLICATIONS

HR1558, U.S House of Representatives, Washington, Apr. 12, 2005.*
D. Thompson, "Crackdown on Web Site 'Hunters'"; Associated Press; May 4, 2005; posted on Internet at cbsnews.com.*
S. Moreno, "Mouse Click Brings Home Thrill of the Hunt: Critics Move to Stop Tex. Online Business"; The Washington Post; May 8, 2005; p. A01.*

(Continued)

*Primary Examiner*—Bernarr E Gregory
(74) *Attorney, Agent, or Firm*—Steven M. Clodfelter

(57) ABSTRACT

A method and system, which may be implemented in some embodiments as a video game, for identifying harmful airborne biota, particularly flying insects, and either killing or disabling the harmful airborne biota is disclosed. Lasers, radar, and other types of radiation may be used to illuminate objects in a detection region, with radiation returns detected and applied to a pattern classifier to determine whether the detected airborne biota are harmful, benign or beneficial. Tracking and classification information may be provided to a remotely located game participant who may be permitted to control measures taken to eliminate the harmful airborne biota, these measures including firing pulses of beamed energy or radiation of a sufficient intensity to at least incapacitate them, or mechanical measures such as flying a remotely-controlled miniature unmanned aircraft to engage and kill the pests.

18 Claims, 4 Drawing Sheets

OTHER PUBLICATIONS

Pages entitled, "About Us," "FAQ," and "Hunting Species Available" on the Internet at www.live-shot.com; accessed on Jun. 14, 2006; the only date on the cited pages is Oct. 15, 2005.*

Definition of the word, "insect," in "Webster's Ninth New Collegiate Dictionary"; Merriam-Webster, Inc.; Springfield, Massachussetts, USA; 1984.*

Edward J. Marshall, "What is a Patent?"; posted on the Internet at marshalliplaw.com/patents.htm; last modifed on Jun. 29, 2004.*

"The Latest Fad in Internet Animal Cruelty: Pay-Per-View Hunting"; no author given; posted on the website of the Humane Society of the United States at .hsus.org; dated Apr. 8, 2005.*

Printout from the Thomas database at the Library of Congress for the status of HR 1558; printed on Jan. 29, 2007; on the Internet at thomas.loc.gov.*

* cited by examiner

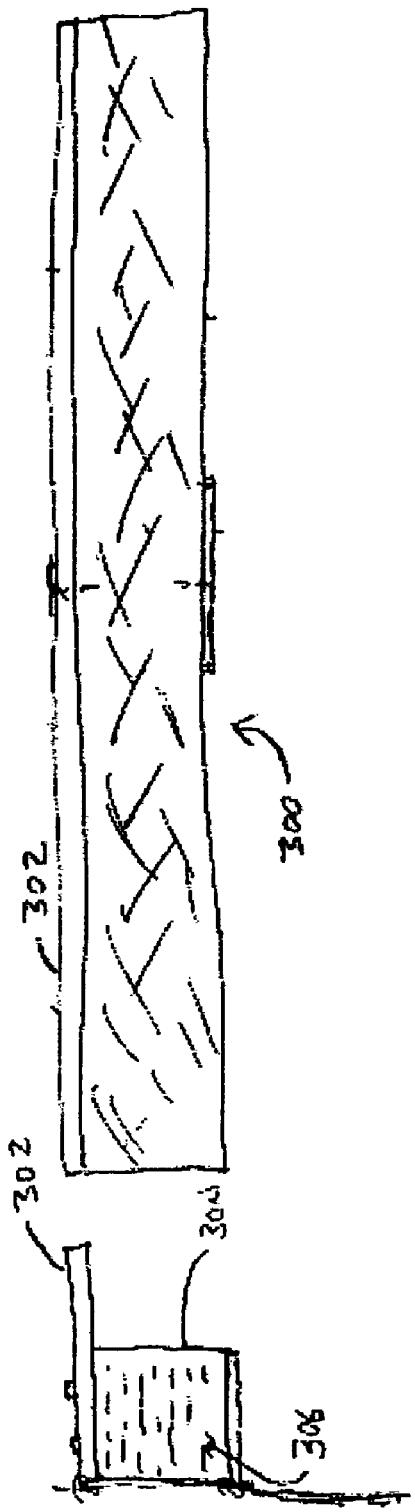
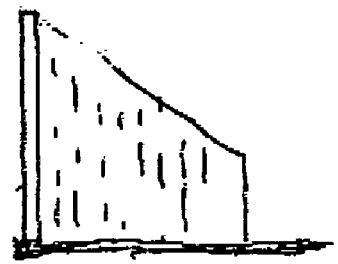
Fig. 3a
Fig. 3b
Fig. 3c

AIRBORNE BIOTA MONITORING AND CONTROL SYSTEM

CROSS REFERENCE TO RELATED APPLICATIONS

This application is a continuation-in-part of U.S. patent application Ser. No. 10/721,112, filed Nov. 25, 2003, now U.S. Pat. No. 6,853,328, issued Feb. 8, 2005, which was a continuation in part of U.S. patent application Ser. No. 09/571,295, filed May 14, 2000, now U.S. Pat. No. 6,653,971, issued Nov. 25, 2003, which claimed the benefit of U.S. provisional patent application No. 60/134,081, filed May 14, 1999.

BACKGROUND OF THE INVENTION

This method and system relates generally to insect and pest monitoring and control, including other forms of airborne biota, and particularly to use of radar, laser, and other optical sensors for detection and discrimination between insect pests and beneficial insects, and includes use of such technologies in a video game application. Precision kill technologies may be utilized to timely kill or disable airborne biota identified as harmful to protected assets. The method also provides for detection of insect pests or pest activity within the protected volume using traps and miniaturized sensors and telemetry systems, and on crop plants or production animals using laser vibrometry and other laser and optical sensors. In some embodiments, the method can be practiced as a video game wherein remotely located participants control kill devices (e.g., lasers, high-power microwave (HPM) devices, remote control or robotic aircraft) against active insect targets or other pests in a real-time environment so as to kill or sufficiently disable pests to prevent them from breeding or engaging in destructive activity.

Applicants' prior patents and patent applications have described problems associated with insects and other airborne biota and described apparatus and methods for protecting crops and other assets from insects and other airborne biota. The instant application hereby incorporates Applicants' U.S. Pat. No. 6,653,971, entitled "Airborne Biota Monitoring and Control System," herein by reference in its entirety, and also hereby incorporates Applicants' U.S. Pat. No. 6,853,328, also entitled "Airborne Biota Monitoring and Control System," herein by reference in its entirety.

The instant application describes additional embodiments and methods of use for some of the component elements and inventions described in Applicants' prior applications and patents, some of which may now become preferred embodiments, and expands upon embodiments and methods that may be used particularly when selected embodiments of the instant invention are implemented to enable or enhance practice of the invention wherein some functions of some elements may be controlled by human operators, and in particular wherein those human operators are located remotely from a location of sensors, processors, and weapons. In some embodiments, as described in prior patents and patent applications, remotely located human operators may be presented with displays based upon sensor observations and may remotely operate controls so as to cause weapons to engage targets deemed to be harmful or potentially harmful to protected assets.

BRIEF SUMMARY OF THE INVENTION

A system for disabling or killing at least one pest insect is described. The system includes a pest insect detection system positioned to detect a pest insect and develop targeting information related to the pest insect. The system includes a communications interface receiving developed target information related to the pest insect and transmitting target information to a computer where target information is displayed. The system includes a human-operable interface coupled to the computer for allowing a human to generate control signals responsive to displayed target information. The system also includes a pest insect disabling or killing system responsive to the control signals received via the communications interface.

BRIEF DESCRIPTION OF THE SEVERAL VIEWS OF THE DRAWING

FIGS. 3a and 3b are end-on and face-on views of an alternate embodiment for an overhead kill plane backstop incorporating an optional sunshade or optional solar panels.

FIG. 3c is an end-on view showing an alternative configuration to obtain solar shading.

DETAILED DESCRIPTION OF THE INVENTION

Figure 1:
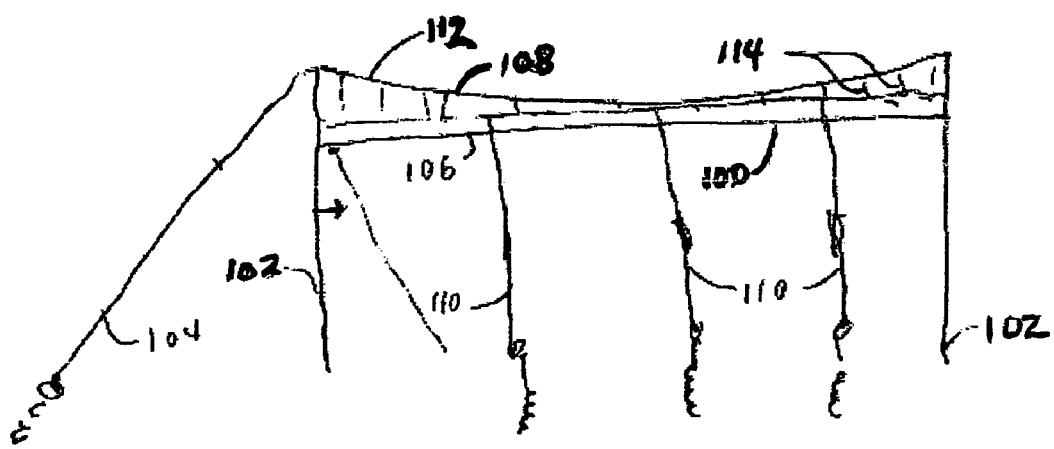
FIG. 1 is an illustration of an overhead kill plane backstop supported by a suspension cable and stabilized by stabilizing rods.

FIG. 1 illustrates how an overhead kill plane backstop used in conjunction with the instant invention may be supported and stabilized to reduce or eliminate vertical swaying motions or twisting motions which may otherwise interfere with backstop functionality. Support structures 102, which may be conventional utility poles made of wood, steel, or reinforced concrete (e.g., spun-cast concrete poles) conventionally set in soil or mounted on a footing, are used to support overhead kill plane backstop 100, which may be of multilayer fabric or other appropriate material, as described in Applicants' patents cited previously and incorporated herein. Other appropriate materials for an overhead kill plane backstop may be lightweight rigid panels, e.g., honeycomb or similar materials, as described more fully below, which provide enhanced stability as well as an ability to withstand multiple "hits" by a relatively high power laser. Adjustable stabilization rods 110 may be used at various intervals, e.g., 100 feet or so, to help minimize vertical swaying, or twisting, of backstop material, particularly in moderate winds. Stabilization rods 110 may be attached at one end to attachment points which may comprise metal fittings affixed to a lower support cable 106 or an upper support cable 108. Stabilization rods 110 may be made adjustable in length, for example, by being made of telescoping sections wherein a desired length is maintained by a compression clamp, screw-down compression fitting, or the like. A lower end of a stabilization rod 110 may be attached to an anchor point on or in the ground, which may be, for example, a split disk screw-in anchor or the like as are commonly used to anchor guy wires on small antennas or utility poles. Alternatively, for some soil types and environments, an anchor point may comprise a heavy object resting on the ground, such as a 5-gallon bucket filled with cement and having a cast-in anchor loop. For longer spans, support structures 102 may extent above a desired height for an overhead kill plane backstop 100, and a suspension cable 112 may be extended between support structures above a desired height for backstop 100, and suspension riser cables 114 placed at intervals between suspension cable 112 and a cable supporting backstop 100, or an attachment point on a rigid backstop. In some embodiments, where there is a danger of a tree, limb, or other object falling across a backstop support structure, ends of support cables may be attached with breakaway devices so that backstops and support cables may be allowed to detach and fall under weight of a falling limb or tree without causing severe damage, for example, to a support structure 102.

Figure 2A:
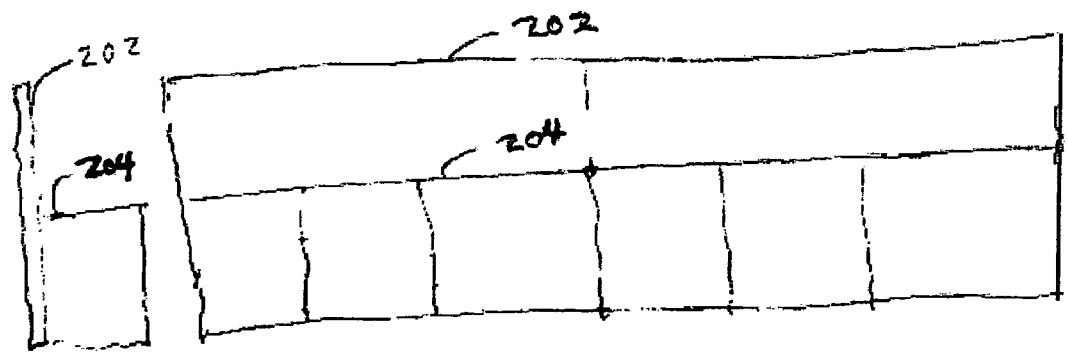
FIGS. 2a and 2b are side-on and face-on views of an alternate embodiment of overhead kill plane backstop having rigid panels made of honeycomb or similar lightweight rigid materials.
Figure 2B:
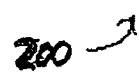

FIGS. 2a and 2b illustrate end-on and face-on views of an alternate embodiment 200 of an overhead kill plane backstop, which may comprise lightweight rigid panels, such as may be made from aluminum honeycomb sandwich construction or from a construction similar to that used in corrugated cardboard. Kill plane backstops made of honeycomb panels may use a support panel 202 comprising a honeycomb core with thin sheets of aluminum or similar material bound to either side for structural strength, and an additional backstop panel 204 of open-faced honeycomb core material adhesively bonded or otherwise attached to a side of a support panel so that an open-faced honeycomb core, having a typical depth of approximately 2.5 cm to 7.5 cm, and a honeycomb cell dimension of approximately 0.7 cm, may be placed toward a kill laser in a typical overhead kill plane or a sidewall kill plane. Front surfaces of open honeycomb mesh may have small retro-reflectors (e.g., miniature cat-eye microbead reflectors or miniaturized corner reflectors) affixed so as to create a unique optical signature when illuminated by a laser beam, but honeycomb cell walls and other surfaces facing toward a kill laser may have a dark, anodized or similar coating that reduces specular and other reflections from honeycomb surfaces. Use of a backstop with a front face (i.e., side facing a kill laser) similar to that of open honeycomb cells will reduce likelihood of potentially eye-damaging specular reflections, especially for laser beams incident at significant angles with respect to a perpendicular to the face of the backstop, as may possibly occur from a flat-faced (e.g., fabric) backstop with a coating of water (e.g., after a rain). Conventional structural reinforcement and optional attachment points for optional attachment to suspension riser cables, as described in associated with FIG. 1, may be added as needed. Individual panel sections having typical lengths of 1 to 5 meters may be joined together using shear pins or similar breakaway construction techniques to minimize damage to a suspended backstop due to falling limbs and trees or similar maladies. A screen mesh of fine, preferably black wire, having a mesh spacing of approximately 3 millimeters, may be stretched or otherwise placed over a front surface of a backstop so as to reduce likelihood that mud daubers or other wasps would build nests within the open-faced honey-comb cells.

FIGS. 3a and 3b provide end-on and face-on views of an alternative embodiment 300 of an overhead kill plane backstop wherein an additional, generally horizontal, sunshade panel 302 is added on a top surface of a backstop, with a portion of sunshade panel 302 extending in a cantilevered fashion over the front face 304 of a backstop panel 306 so as to provide shade from sunlight (or moonlight) over the front face 304 of backstop panel 306 for at least a portion of a day. This feature may help reduce signal-to-noise problems when viewing airborne biota targets against a suspended backstop or when using a pre-pulse to find a unique optical signature of a kill plane backstop as described earlier herein. In an alternate embodiment, sunshade panels 302 may also include or be comprised of solar panels, i.e., panels of solar cells, capable of generating electricity from sunlight. Such panels may be electrically connected, preferably in an electrically parallel fashion, to insulated support cables or other electrical conductors to transmit electricity back to power conditioning units, which may be located on backstop support poles, on sensor/weapon poles associated with sensor, processor, and weapon electronics, or in other suitable locations. Breakaway structural and electrical connectors may be used to interconnect individual sections of backstop structure, typically 1 to 5 meters long, to form whatever length of kill plane backstop may be required for a given application and installation.

FIG. 3c provides an end-on view of an alternative embodiment that may be used wherein open-face cells of honeycomb material are cut at a slant to provide shading of lower portions of a panel for at least a portion of a day.

Figure 4A:
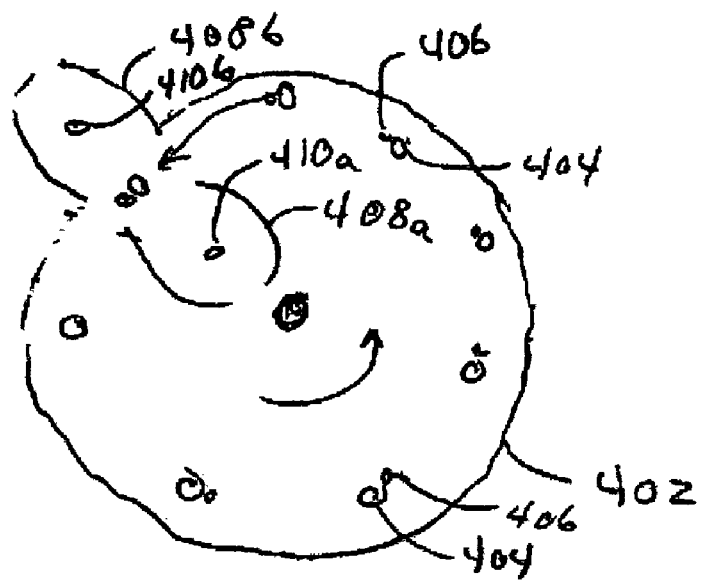
FIG. 4a is an end-on view of a rotating "Gatlin-gun" assembly containing lasing or laser amplifier elements (i.e., rods, tubes, disks, fibers).
Figure 4B:
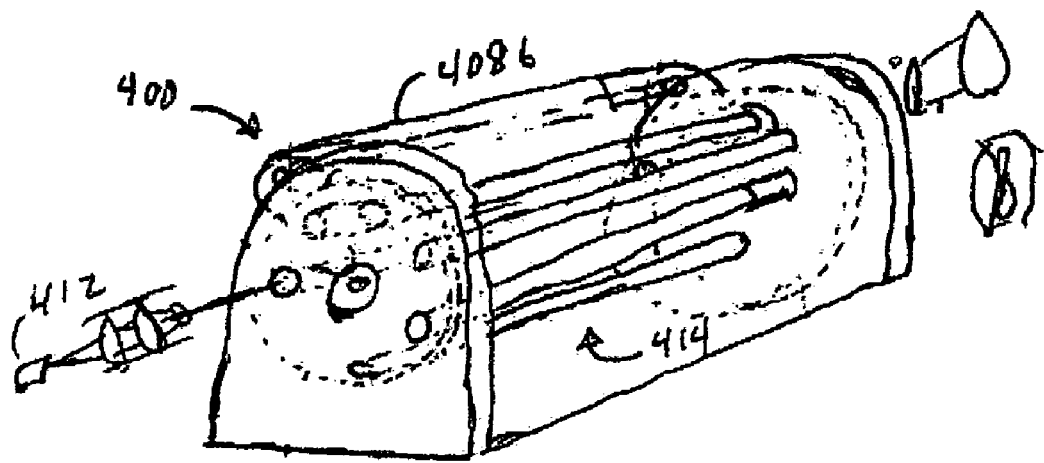
FIG. 4b is an isometric view illustrating how a rotating assembly of lasing elements may be used in a "Gatlin-gun" laser amplifier.
Figure 5:
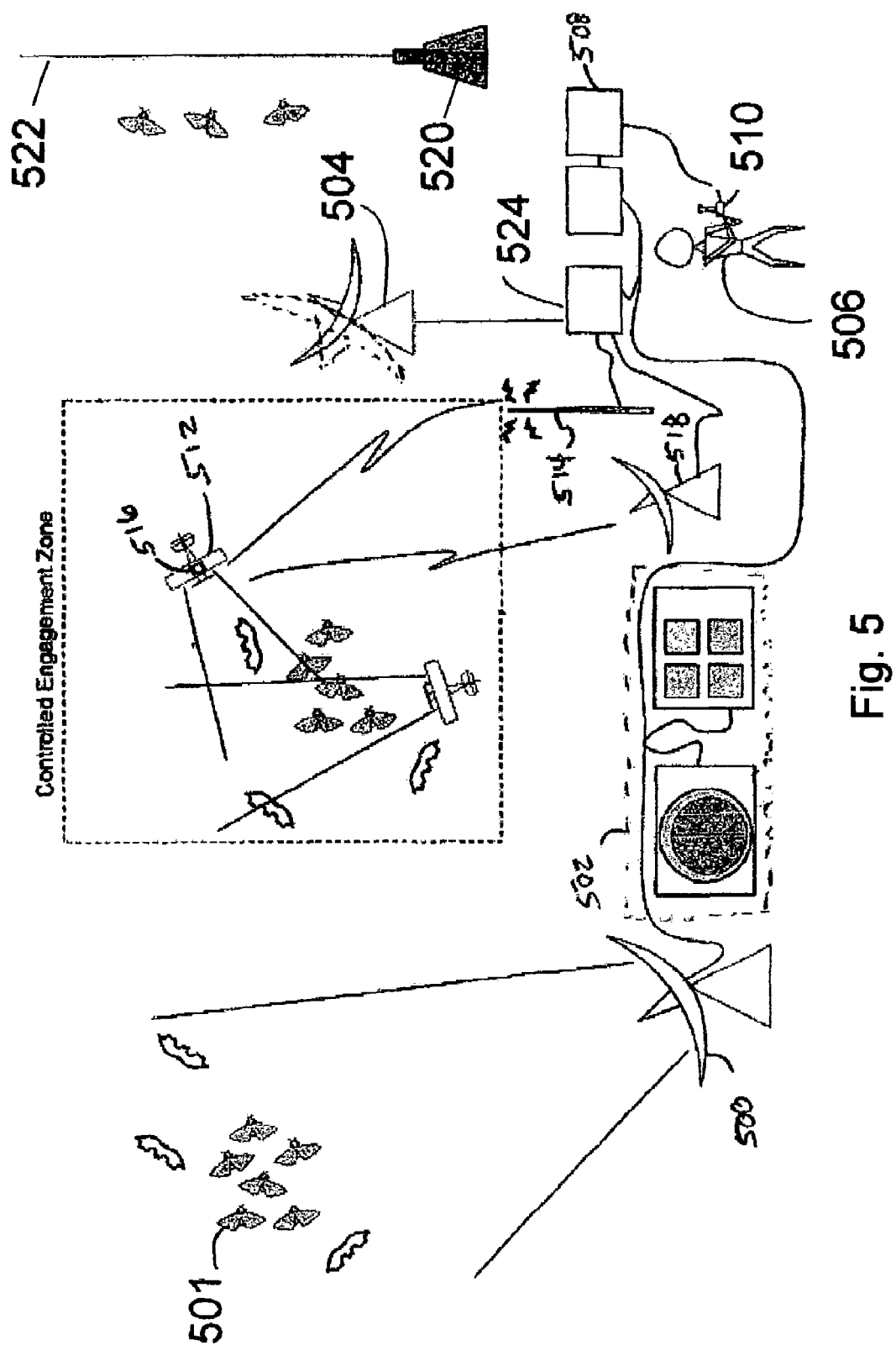
FIG. 5 is an illustration showing how sensors, weapons, video-telemetry, and telecommunications may be combined to provide a remote control video-game capability for engaging migrating moths.

Applicants' earlier patents and patent applications noted that various type of laser technologies may be used for a kill laser. Candidate laser technologies that may be used to achieve adequate short or extended pulse energy or power needed to disable, or otherwise render incapable of causing damage to a protected asset, an insect or other airborne biota, include solid state lasing rods, such as NdYAG or Nd-Glass lasers. However, one problem in using such lasing rods is dissipation of power. In an application that may require a pulse rate of many pulses per minute (e.g., to deal with a high rate target influx of moths from a migratory landing), a method for providing adequate cooling for lasing rods would likely be required. Although various embodiments of the instant invention may include use of such lasers, complete with air, liquid, or other forms of passive or active cooling of lasing rods, another option may be to use an assembly such as illustrated in FIGS. 4a and 4b, which includes multiple lasing rods arranged in a circular fashion, somewhat like multiple barrels in a Gatlin gun. FIG. 4a provides an end-on view of such an assembly wherein multiple lasing rods 404 are arranged, evenly spaced, around a circle in a support plate or disk 402. Lasing rods 404 serve as laser amplifiers for a laser pulse which may be generated by lower power laser, so as to provide a laser pulse with sufficient energy or power to serve as a kill pulse, or as a member pulse in a kill pulse sequence, as described in Applicants' prior patents and patent applications. In some embodiments, separate lasing rods 406, which may be smaller in diameter than lasing rods 404, may be used to support generation of a pre-pulse as described in Applicants' prior patents. When assembled in an assembly similar to that illustrated in FIG. 4b, a rotating assembly 414 of lasing rods may be configured so that each individual rod, in sequence, rotates through a focal point of multiple, reflecting, cylindrical elliptical cavities 408a, 408b, wherein an opposite focal point of each cavity contains a flashlamp 410a, 410b, respectively, so that when a lasing rod 404 (or 406 in some embodiments) is rotated through, or into, a focal axis of cylindrical elliptical cavities 408a, 408b, and flashlamps 410a, 410b are energized, a population inversion is created in lasing rod 404 or 406, and lasing, or laser amplification of a synchronized laser pulse generated in a separate lower-power laser 412, occurs. Rotating assembly 414 of lasing rods may contain a conventional shaft encoder and conventional servomotor and control system and thus be conventionally spun at a high rotation rate, with firing of flashlamps 410a, 410b and lower power laser 412 synchronized to energize and fire a selected lasing rod when needed, under influence of a control system which maintains knowledge of, and controls, frequency of firing of each lasing rod, so as to maintain an even heating load across all rods. Alternatively, rotating assembly 414 may be operated by a stepper motor so that each lasing rod 404 (or 406), in turn, is positioned at a focus of elliptical cavities so that the lasing rod may be energized and fired when needed under control of a firing system. The fired lasing rod is then rotated out of position and allowed to cool (under active or passive cooling) until rotated again into firing position. The lasing rod "Gatlin gun" assembly 400 may be configured with appropriate mounting points and openings for integrated with optical paths and other components of an embodiment of an airborne biota monitoring and control system of Applicants' invention.

Other candidate technologies are available or emerging for laser weapons, as well as for coherent or non-coherent light sources for use with laser sensors or other optical sensors, that may be used with embodiments of the instant invention. These candidate technologies include high-power semi-conductor lasers, e.g., high power laser diodes, which may be used for direct illumination of a target or as a source of pump light for a lasing medium, which, in turn, is used to illuminate a target. Another emerging laser technology which may be used with benefit in various embodiments of Applicants' invention include fiber lasers and fiber laser amplifiers, particularly those capable of operating in eye-safe wavelengths. Fiber lasers may be used in a laser weapon of sufficient energy or power to disable harmful insects or other biota, as well as in sensors based on laser illumination of targets.

Migrating insect species typically fly at altitudes from a few tens to hundreds of feet, and up to a few thousand feet, above surrounding terrain. FIG. 5 illustrates how elements of the instant invention may be deployed in a manner that will permit engagement of migrating insect pests or other airborne biota traveling through a region. Such a deployment of elements may be positioned, for example, along a bank of a river (preferably an opposite bank to the direction from which migrant species are expected to approach) over which migrant species are known to fly or float. For biota such as Heliothis moths that may be detected by radar or a ladar, an early detection sensor 500, which may be a radar, or a combination of a radar and a ladar, operating outwardly and upwardly above a river may provide initial detection of an inbound cluster of migrants 501, and may also provide initial tracking and discrimination of a cluster, or individual members of a cluster, of arriving migrants 501. Such detection may occur at ranges of approximately 2 kilometers or greater for some species and for favorable operational conditions. Information collected by early detection sensor 500 is communicated to a control system 502 comprising additional tracking and discrimination capabilities, and which may also have selected display capabilities. Control system 502 may be co-located near early detection sensor 500, or control system 502 may be located at a site somewhat or very remote from early detection sensor 500. In a video game or other remote control application, information from early detection sensor 500 may be provided directly, or in a summarized form, to potential game participants 506 or operators to alert them via Internet or other telecommunications media of arrival of "combatants" to be engaged. As migrants 501 continue to fly generally toward a location of an early warning sensor 500, additional sensors 504, which may include radar, ladar, or other laser and optical sensors, acquire, track, and provide, via a communications interface 524, to control system 502 and to remotely located participants 506 and associated remotely located computers 508, via Internet or other telecommunications media, additional tracking and discrimination information on clusters of, or individual, migrants, and weapon assets are readied to engage migrants potentially classified as harmful species. Weapon assets may include small, remotely controlled aircraft, similar, for example, to an electrically powered Black Widow micro-UAV (unmanned air vehicle) developed by AeroVironment, Inc., of Monrovia, Calif., as well as lasers or other small aircraft or directed energy weapons. As migrants 501 approach within range, small semi-autonomous but also remotely piloted aircraft 512 may be launched toward approaching migrants, and may be pre-programmed to fly to and maintain a specified altitude and general location under control of a semi-autonomous flight control system which may include a global positioning system (GPS) or advanced miniaturized inertial guidance system, such as available from MicroPilot, a company located near Winnipeg, Canada (www.micropilot.com), as well as from other sources. In a video game or other remote control application, control of a specific miniature, radio-controlled aircraft 512, controlled via a telemetry or other radio link 514, may be passed to a remote game participant 506 or other operator, who may then be given an opportunity to fly aircraft 512 toward a selected migrant target or target cluster of migrants 501 determined to be a harmful species by entering commands via a joystick or other game controller 510. A live video downlink 518 from a camera 516 on aircraft 512 may be used to provide a near real-time display, directly or after compression processing, to a remote game participant 506, who may then use such a signal to steer aircraft 512 toward, and attempt engagement, via direct contact (e.g., with a propeller or other kill enhancement device, as described in Applicants' earlier patents), or via use of a miniature gun (e.g., using a shell similar to 22-caliber rat shot, but with environmentally safe pellets made of steel or other material besides lead), of via use of a miniature laser, preferably configuration for "lethality" at only a short range by either use of focusing optics or by use of laser wavelengths absorbed in air, or a combination thereof. After a game participants "time" is over, aircraft 512 may be programmed to fly itself back to a landing site or apparatus, wherein aircraft 512 may be serviced or automatically recharged for return to "alert" status. Aircraft 512 may also be programmed to resort to autonomous control if a game participant 506 or other remote operator attempts to fly aircraft 512 beyond permitted regional limits or altitudes.

Continuing with the example embodiment illustrated in FIG. 5, potentially harmful migrants 501 that survive engagement with remotely controlled aircraft 512 may subsequently be engaged by laser weapons 520, positioned and configured to fire generally upward 522, and using focusing, selected wavelengths, and other techniques described in Applicants' prior patents, to insure safe operation, particularly relative to aircraft or persons in aircraft, balloons, or the like in regions beyond a designated kill altitude. Laser weapons 520 may be combined with, or include, a laser sensor or laser sensing capability to aid in precision tracking and discrimination of candidate targets before engagement.

As described in Applicants' prior patents and patent applications, sensors may include RF radars, laser radars or ladars, other RF or optical sensors, including spectrometers or spectral line sensors, which may be used to detect, track movement and selected characteristics of airborne biota, and classify airborne biota as potentially harmful, beneficial, or neutral with respect to a protected asset. Processors may include specialized signal processor integrated circuits as well as higher-level processors which operate on signals, or groups of signals, from sensors, and use other information such as synchronization signals and attenuator and amplifier settings, to condition signals and extract information from signals, such as range to target, amplitude of signals reflected from target, Doppler-induced frequency shifts, relative spectral amplitudes, and the like. Weapons which may be used to destroy, kill, disable, or interfere with movement of airborne biota may include not only lasers, high-power microwave, or other directed energy weapons, but also specially modified versions of miniature remotely controlled or semi-autonomous unmanned air vehicles (UAVs), such as so-called micro-UAVs developed by AeroVironment, Inc. (e.g., AeroVironment's Black Widow micro-UAV) and other companies, some under funding from the U.S. Department of Defense Defense Advanced Research Projects Agency (DARPA) and other Government agencies, and radio-controller helicopters and airplanes similar to those flown by so called RC hobbyists, such as available from HobbyTown USA™ through their HobbyOutlook™ catalog. Some existing micro-UAVs, such as AeroVironment's Black Widow, already have miniature cameras capable of sending live video back to a receiving station. Although such cameras are generally oriented to allow viewing of targets on the ground, cameras could be re-oriented and equipped with suitable optics to allow cameras to image flying insects or other biota in front of the miniature aircraft. Others could be modified to add such cameras.

Having thus described our invention and the manner of its use, it should be apparent from our disclosure to one skilled in the arts to which the subject application pertains that incidental changes may be made thereto that fairly fall within the scope of the following appended claims, wherein we claim:

1. A system for disabling or killing a pest insect comprising:
    a pest insect detection system positioned to detect said pest insect and develop target information related to said pest insect,
    a communications interface that receives said developed target information related to said pest insect and that transmits said developed target information to a computer where said developed target information is displayed,
    at least one human-operable interface coupled to said computer for allowing a human to generate control signals responsive to displayed said developed target information,
    a pest insect disabling or killing system responsive to said control signals received via said communications interface.

2. The system of claim 1 wherein said control signals comprise pointing and firing commands.

3. The system of claim 2 wherein said pest insect disabling or killing system further comprises a laser responsive to said control signals.

4. The system of claim 1 wherein said control signals comprise flight control commands and said pest insect disabling or killing system is a radio-controlled aircraft responsive to said flight control commands.

5. The system of claim 4 wherein said developed target information includes live video developed by a video camera mounted to said radio-controlled aircraft and transmitted to said computer over a communications link for display to a human who enters said flight control commands to direct said remote-controlled aircraft toward said pest insect responsive to said live video.

6. The system of claim 4 wherein said radio-controlled aircraft is equipped with any of:
    a projectile throwing device,
    a laser,
    a pesticide sprayer.

7. The system of claim 1 wherein said developed target information includes any of:
    range,
    position,
    radar cross section,
    amplitude of reflected signal,
    wing beat frequency,
    intensity ratio of selected spectral lines, bands, or frequencies,
    respiration rate,
    Doppler induced frequency shift,
    polarization ratio.

8. The system of claim 1 wherein said pest insect detection system further comprises:
    at least one energy beam transmitter,
    a receiver of a return signal from a reflected said energy beam, and wherein said receiver of a return signal is any of:
        a radar receiver,
        a laser receiver,
        any other optical sensor.

9. The system of claim 1 wherein said developed target information is integrated into video game software within said computer, and said video game software develops said control signals responsive to a human playing said video game software.

10. The system of claim 1 wherein said pest insect detection system further comprises any of:
    a software program for specifically discriminating between a pest insect and non-pest insects and animals,
    a disablement interface to said pest insect disabling or killing system to prevent said disabling or killing of said non-pest insects and animals, and,
    logging software for logging selected parameters of said developed target information.

11. The system of claim 1 wherein said computer is located proximate a location where said pest insect disabling or killing system is located.

12. The system of claim 1 wherein said computer is located remotely from a location of said pest insect disabling or killing system, with said developed target information and control signals transmitted to and from, respectively, said computer via the Internet or another telecommunications media.

13. The system of claim 1 wherein said pest insect disabling or killing system is any of:
    a laser,
    a high power microwave weapon,
    a remotely controlled aircraft,
    an autonomously piloted unmanned aircraft.

14. A system for disabling or killing at least one pest insect comprising:
    at least one energy transmitter positioned to emit detection energy into a region where said pest insect is detected,
    at least one receiver of said detection energy reflected from said pest insect,
    at least one processor responsive to said receiver of said detection energy for processing at least a portion of said detection energy reflected from said pest insect to develop information related to said pest insect,
    a communications interface coupled to said at least one processor for transmitting said information related to said pest insect to a remotely located human-controlled computer for display to a human operator, and for receiving control commands from said human-controlled computer, a pest insect disabling or killing system responsive to said control commands from said human-controlled computer.

15. The system of claim 14 wherein said information related to said pest insect and said control commands are integrated into a video game played by the human operator.

16. The system of claim 14 wherein said information related to said pest insect includes any of:
range,
position,
radar cross section,
amplitude of reflected signal,
wing beat frequency,
intensity ratio of selected spectral lines, bands or frequencies,
respiration rate,
Doppler induced frequency shift,
Polarization ratio.

17. A system for disabling or killing at least one pest insect comprising:

at least one receiver of energy emitted or scattered from said pest insect, at least one processor for extracting information related to said pest insect from said energy emitted or scattered from said pest insect, a communications interface coupled to said at least one processor for transmitting extracted said information to a computer for generation of a display to a human operator, said communications interface further configured for receiving control commands generated by said computer responsive to a human operating computer controls in response to watching said display, a pest insect disabling or killing system coupled to said communications interface and responsive to said control commands for disabling or killing said pest insect.

18. The system of claim 17 wherein said pest insect disabling or killing system is any of:
a laser,
a high power microwave weapon,
a radio-controlled aircraft,
an autonomously piloted unmanned air vehicle.

* * * * *